Inventor
ORIS C. HILL.

Patented July 1, 1930

1,769,512

UNITED STATES PATENT OFFICE

ORIS C. HILL, OF PAWTUCKET, RHODE ISLAND

SNAP LINK

Application filed June 19, 1929. Serial No. 372,070.

The present invention relates to improvements in snap links or fasteners of the type familiarly used in connecting the ends of chains and intended more particularly for use in connection with anti-skid tire chains.

Among the objects of this invention is the provision of a link which is inexpensive, but extremely efficient and which, while easily applied to or released from the ends of the chain, is so constructed as to resist releasing the ends of the chain unless and until properly manipulated.

Another and important object attained by this invention resides in the shape of the link, which is such as to prevent the snap from twisting or sliding from the side links of the tire chain, especially when used to connect the cross chains to the side chains. This shape, furthermore is particularly designed to fit the concave of the tire, thus making it impossible for the link to cut the casing.

A further object is the provision of a link which is shaped to fit the tire regardless of its position, whether reversed or not, it being well known that the chains for which this link is particularly adapted partake of a rolling motion or action when in use, which motion is apt to cause the link to turn over.

Other objects will appear as the description proceeds, the invention being illustrated in the accompanying drawings and consisting in certain novel features specifically defined in the claims.

Figure 1:
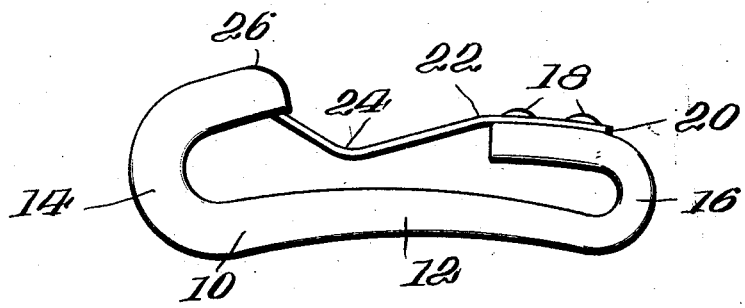
Figure 2:
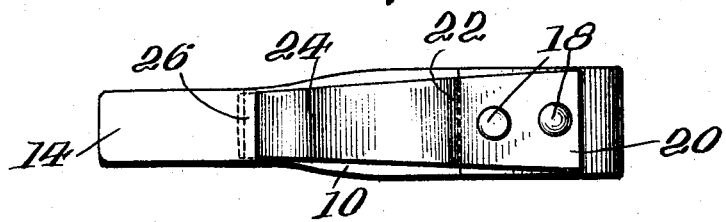

In the drawings, wherein like elements are designated by like reference numerals, Fig. 1 illustrates a side elevation of the link;

Fig. 2 discloses a plan view thereof; and

Figure 3:
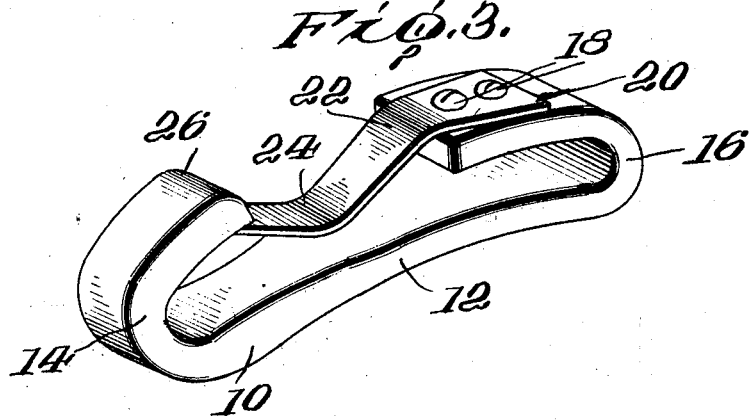

Fig. 3 is a perspective showing of the same link.

More specifically, the link comprises a body member 10 formed preferably from a metallic strap of suitable dimensions having its intermediate portion arched, as shown at 12, and its ends doubled back to form hooks 14 and 16 adapted for engagement in the end links of the cross tire chains, and the arched portion conforming generally to the curvature of a tire casing.

One of the hooked ends 14, is desirably spaced further from the arched portion 12, than the other end 16, which has attached thereto by any suitable means, as rivets 18, a spring tongue 20, arranged to extend across and close the space or opening between the bills of the hooks 14 and 16, and having its free end disposed to bear against the inner side of the cooperating bill of hook 14.

It will be noted that the spring tongue is bent inwardly at 22 to accommodate the angular relation of the engaged surfaces and that its resilience holds the free end against the hook 14 in closed position.

An important feature of this invention may be observed in Figs. 1 and 3, wherein is disclosed an inward curvature or bend of the spring tongue, at 24, whereby the tongue is provided with an inward arched portion similar to that of the body member shown at 12. Not only does this inward bend 24 prevent the snap from twisting or sliding from the side chain, but in addition the curved shape fits the concave of the tire, making it impossible to cut the tire from the rolling action of the chain when in use. This feature makes the link particularly desirable, if, as frequently occurs, the snap should inadvertently be attached reversely to the side chain, instead of in its intended position.

The bill of hook 14 may be rounded as at 26 to carry out the general configuration of the spring side of the link, in a manner similar to the curvature of the solid side.

Another advantage of the bent spring, and also its cooperation with the curved portion 12, resides in the fact that while the end of a chain may be readily engaged with either hook 14 or 16, it cannot be readily separated therefrom under chance blows or accidents, inasmuch as the bend 24 forms in effect, a shoulder offering obstruction to free egress of the chain.

Furthermore, when the free end is being engaged with the hook 14, its entanglement with the previously connected end to hook 16 is avoided as the portion 24 limits the sliding of the chain along the hook body.

In use, the proper link of a chain is engaged over hook 14 and moved along the body of the snap, to hook 16, whereupon the hook 14 is free to receive the chain portion which is to be connected.

This snap link is particularly adapted to use in connecting the cross members of an anti-skid chain, to the side chains, or for use as a repair link in such chains.

Having thus described my invention, what I claim as new and desire to secure by Letters Patent of the United States, is:—

1. A snap link comprising a body portion having inturned ends, and a spring member attached to one of said ends and bearing against the other of said ends, said spring member being inwardly arched at a point spaced from the ends of the spring member, thereby to retain inserted links against accidental displacement, and said body portion also being inwardly arched, to produce a link having oppositely concaved sides.

2. A snap link comprising a body portion having inturned ends spaced unequally from said portion, and a spring member attached to one of said ends and bearing against the other of said ends, said member being inwardly arched at a point spaced from the ends of the spring member, and said body portion also being inwardly arched, to produce a link having oppositely concaved sides, shaped to fit the curvature of a tire casing.

3. A fastening link comprising a body portion having an opening for the insertion of chain links, a closure for said opening, and means to retain the inserted links against accidental displacement from said body portion, comprising an arch extending inwardly from said closure at a point spaced from the ends thereof, and an arch extending inwardly from said body portion.

In testimony whereof I hereunto affix my signature.

ORIS C. HILL.